United States Patent
Fullbeck et al.

(10) Patent No.: US 7,066,497 B2
(45) Date of Patent: Jun. 27, 2006

(54) FITTING FOR A FLEXIBLE METAL HOSE

(75) Inventors: Wolfgang F. Fullbeck, 23927 Gabbard Dr., Lawrenceburg, IN (US) 47025; Mark A. Hess, Cincinnati, OH (US)

(73) Assignee: Wolfgang F. Fullbeck, Lawrenceburg, IN (US)

( * ) Notice: Subject to any disclaimer, the term of this patent is extended or adjusted under 35 U.S.C. 154(b) by 0 days.

(21) Appl. No.: 10/703,232

(22) Filed: Nov. 7, 2003

(65) Prior Publication Data

US 2005/0099005 A1    May 12, 2005

(51) Int. Cl.
*F16L 33/00* (2006.01)

(52) U.S. Cl. .................... 285/256; 285/903; 29/890.14

(58) Field of Classification Search ................ 285/903, 285/256, 241; 29/890.14
See application file for complete search history.

(56) References Cited

U.S. PATENT DOCUMENTS

| | | | |
|---|---|---|---|
| 2,481,001 A | 9/1949 | Burckle | |
| 2,848,254 A * | 8/1958 | Millar | 285/256 |
| 4,046,451 A * | 9/1977 | Juds et al. | 285/903 |
| 4,089,351 A | 5/1978 | Ward et al. | |
| 4,871,198 A * | 10/1989 | Hattori et al. | 285/903 |
| 5,129,686 A | 7/1992 | Sanders et al. | |
| 5,349,988 A | 9/1994 | Walsh et al. | |
| 5,398,977 A * | 3/1995 | Berger et al. | 285/903 |
| 5,413,147 A | 5/1995 | Moreiras et al. | |
| 5,423,578 A | 6/1995 | Kanomata et al. | |
| 5,486,023 A | 1/1996 | Sanders et al. | |
| 5,638,869 A | 6/1997 | Zaborszki et al. | |
| 5,857,716 A | 1/1999 | Thomas | |
| 6,016,842 A | 1/2000 | Rooke | |
| 6,036,237 A | 3/2000 | Sweeney | |
| 6,102,445 A | 8/2000 | Thomas | |
| 6,260,584 B1 | 7/2001 | Foti | |
| 6,276,728 B1 | 8/2001 | Treichel | |
| 6,378,914 B1 | 4/2002 | Quaranta | |
| 6,428,052 B1 | 8/2002 | Albino et al. | |
| 6,592,153 B1 | 7/2003 | Belcher | |
| 2002/0079702 A1 | 6/2002 | Baumann et al. | |
| 2002/0185866 A1 | 12/2002 | Bowman | |

FOREIGN PATENT DOCUMENTS

| | | | |
|---|---|---|---|
| EP | 0 332 853 | 2/1989 | |
| EP | 474114 | * 8/1991 | ................. 285/903 |
| FR | 2144147 | 1/1973 | |
| GB | 718261 | 11/1954 | |
| GB | 1 476 065 | 6/1977 | |
| WO | WO 02/061322 | 8/2002 | |

\* cited by examiner

*Primary Examiner*—David Bochna
(74) *Attorney, Agent, or Firm*—Wood Herron & Evans, LLP

(57) ABSTRACT

A flexible hose formed from corrugated metal tube has a fitting permanently crimped to the end of the hose. The fitting includes an elongated stem having a first end adapted to be coupled to an appropriate fitting surface and a second end configured to be received within the hose. A sealing member disposed on the second end of the stem seals the fitting between the corrugated metal tube and the stem. A ferrule is placed over the hose and is crimped to compress the hose and sealing member between the ferrule and stem.

15 Claims, 3 Drawing Sheets

FITTING FOR A FLEXIBLE METAL HOSE

FIELD OF THE INVENTION

The present invention pertains generally to fittings for hose, pipe and other conduits, and more particularly to a fitting for a flexible hose or pipe formed from corrugated metal tube.

BACKGROUND OF THE INVENTION

Flexible hoses formed from corrugated metal tube are used in many applications where the hose is exposed to severe conditions or where the nature of the material conveyed through the hose requires the use of metal tubing. Advantageously, the corrugations lend some degree of flexibility to the metal tube. Typical uses of these hoses include applications where the hose is exposed to extreme hot and cold temperature conditions, where high pressure gas or liquid is transported through the hose, or when fluid permeability is a concern, such as in gas piping systems, refrigeration systems or the transport of chemical materials. These hoses also provide flexibility to fixed piping systems, for example, where adjacent fixed pipes must be joined together, and help to reduce vibrations in dynamic environments, such as various heavy machinery or automotive environments, all while maintaining integrity in these rigorous applications.

With flexible hoses formed from corrugated metal tube, it is of utmost importance to ensure that the hoses are constructed in a fluid tight manner, particularly at locations where fittings are joined to the hose for coupling the hose to a fluid conveying structure or to another hose. In the past, various fittings have been secured to the corrugated metal tube of flexible hoses by welding, brazing, or other fusion-type processes, or by deforming the corrugated metal tube to create a flange which may be mechanically clamped to a fitting, such as by a screwed compression assembly. For example, U.S. Pat. No. 6,276,728 is directed to a fitting for use with corrugated tubing wherein the tubing is deformed when it is secured to the fitting. U.S. Pat. No. 5,638,869 is directed to a hose connection that is both crimped and welded to secure a corrugated metal hose to the fitting. These prior fittings are generally costly and time consuming to install and are prone to inconsistencies stemming from the varied levels of skill of persons installing the fittings. These variations result in inconsistent quality of the resulting hose assemblies. Accordingly, there is a need for a fitting that can be used with flexible hoses formed from corrugated metal tubes which overcomes these and other drawbacks of the prior art.

SUMMARY OF THE INVENTION

The present invention provides a fitting configured to be permanently crimped to the end of a flexible hose formed from corrugated metal tube. The corrugated metal tube has an interior surface which is contoured by the corrugations, and the fitting includes an elongated, tubular stem with one end configured to be inserted within the hose. The other end of the stem is adapted to mate with a corresponding fitting surface. A sealing member is sized to be received within the hose, between the corrugated tube and the stem, and has an outer surface that is contoured to match the inner surface of the corrugated tube. The fitting further comprises a ferrule configured to be received over the end of the hose and to be crimped to the hose to thereby secure the fitting to the end of the hose.

In one embodiment, the ferrule and stem have corresponding threaded portions for threadably securing the ferrule to the stem prior to crimping. Advantageously, the threaded connection helps to maintain the relative positions of the ferrule and stem during crimping of the fitting and couples the stem and ferrule together as a single, integrated unit that resists separation in severe service applications. In another embodiment, one end of the ferrule has an outer diameter that is initially greater than the outer diameter of the other end of the fitting. The ferrule is configured to be deformed to reduce the larger diameter end to be approximately equal in diameter to the initially smaller end.

In another aspect of the invention, a flexible hose assembly includes a corrugated metal tube with a braided metal sheath. A fitting, as described above, is permanently crimped to an end of the hose, over the tube and sheath.

In yet another aspect of the invention, a method of securing a fitting to the end of a flexible hose formed from corrugated metal tube includes inserting a sealing member within the corrugated metal tube, placing a ferrule over the end of the hose, inserting the end of a stem through the ferrule and into the sealing member disposed in the hose, and crimping the ferrule to compress the corrugated metal tube and sealing member between the ferrule and the stem.

These and other features, objects and advantages of the invention will become more readily apparent to those skilled in the art in view of the following detailed description, taken in conjunction with the accompanying drawings.

DETAILED DESCRIPTION

Figure 1:
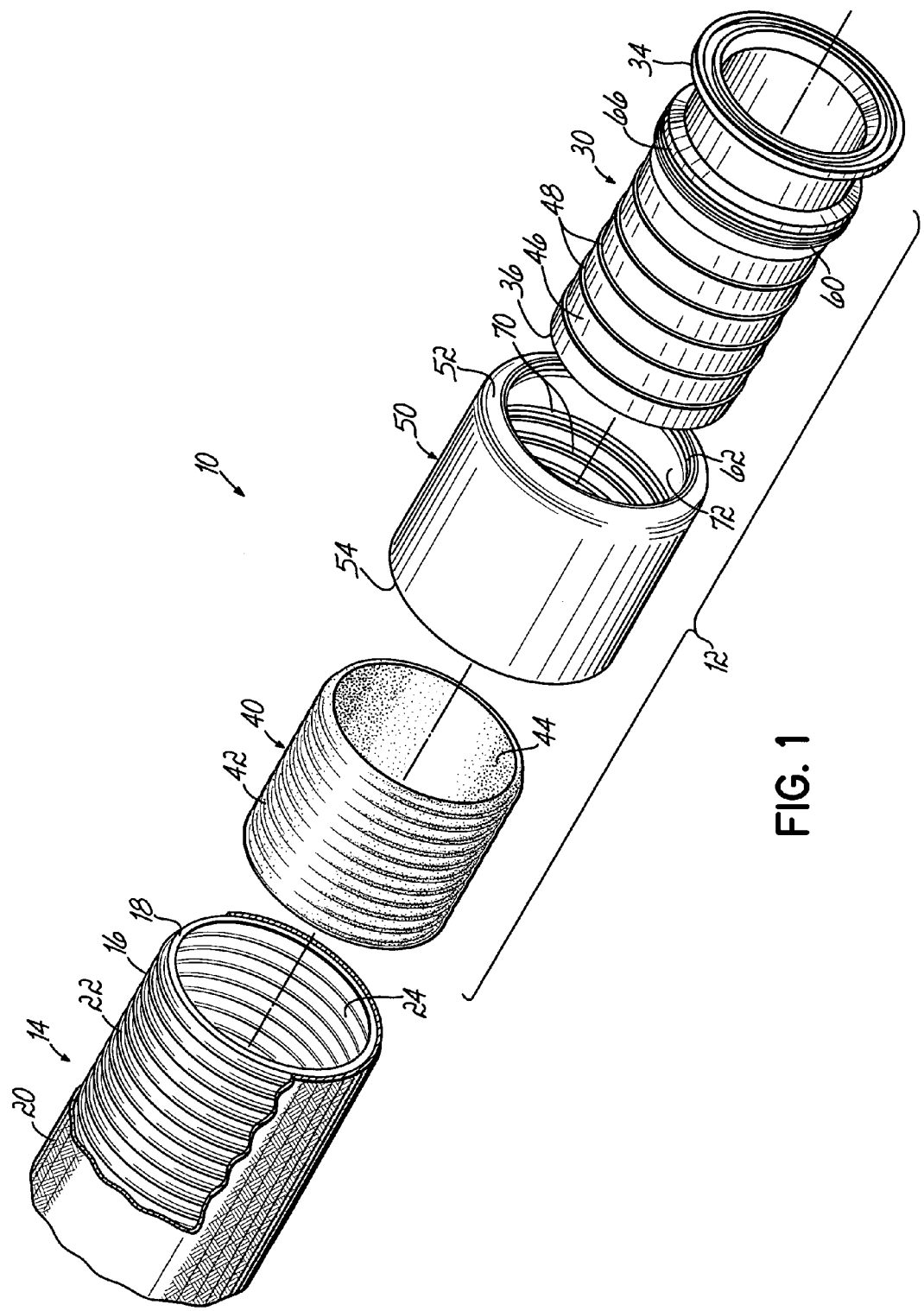
FIG. 1 is an exploded perspective view of an exemplary embodiment of a flexible hose and fitting according to the present invention.

FIG. 1 depicts an exemplary flexible hose assembly 10 including an exemplary fitting 12 according to the present invention. The flexible hose assembly 10 includes a flexible hose 14 formed from corrugated metal tube 16 having a first end 18 configured to receive the fitting 12. In the embodiment shown, the metal tube 16 has annular corrugations, however it will be recognized that the corrugations may alternatively be formed in a spiral fashion, as known in the art. The hose 14 further includes a covering 20 that surrounds an outer surface 22 of the tube 16 and extends the length of the hose 14. In the embodiment shown, the covering 22 is a braided metal sheath, as known in the art. Due to the corrugations formed in the metal tube 16, the outer and inner surfaces 22, 24 of the tube 16 have undulating, contoured surfaces.

The fitting 12 is configured to be crimped to the first end 18 of the hose 14 and includes an elongated tubular stem 30, a sealing member 40, and a ferrule 50. A first end 34 of the stem 30 is configured to mate with a corresponding fitting surface, such as the mounting flange of a machine or a coupling for joining the flexible hose 14 to another hose or conduit. In this regard, it will be recognized that the first end 34 of the stem 30 may be adapted to mate with any configuration of corresponding fitting surface as may be desired. The second end 36 of the stem 30 is sized and shaped to be received within the interior of the corrugated metal tube 16. The fitting 12 further comprises a tubular-shaped sealing member 40 sized to be received over the second end 36 of the stem 30 and having an outer surface 42 shaped to correspond to the inner surface 24 of the corrugated metal tube 16. In the exemplary embodiment shown, the outer surface 42 of the sealing member 40 has undulations which mate with the interior surface 24 of the corrugated tube 16. Advantageously, the interior surface 44 of the sealing member 40 seals against the outer surface 46 of the stem 30 and the outer surface 42 of the sealing member 40 seals against the inner surface 24 of the corrugated metal tube 16. The second end 36 of the stem 30 may further include one or more annular barbs 48 formed into the outer surface 46 to increase the holding ability of the assembled fitting 12 on the end 18 of the flexible hose 14.

The fitting 12 further includes a ferrule 50 having a first end 52 configured to receive the second end 36 of the stem 30 therethrough, and a second end 54 configured to receive the first end 18 of the flexible hose 14 so that the ferrule 50 may be crimped to secure the fitting 12 to the flexible hose 14. As used herein, "crimping" means the deformation of a workpiece, such as a ferrule, in a radially inward direction by application of radial compressive forces. This is distinguished from "swaging," which is the deformation of a workpiece accomplished by forcing the workpiece through a constriction die. It has been determined that, due to the properties of softer materials typically used in swaging operations, crimped ferrules exhibit better hose retaining characteristics than corresponding swaged fittings. Moreover, crimping the ferrule to the hose requires fewer steps to achieve the same reduction, compared to swaging, and is therefore a more efficient process.

In the embodiment shown, the stem 30 further includes external threads 60 formed on the outer surface 46 of the stem 30 between the first and second ends 34, 36. The first end 52 of the ferrule 50 is formed with internal threads 62 which mate with the external threads 60 on the stem 30 to thereby permit threadably coupling the stem 30 to the ferrule 50. Advantageously, the stem 30 may be threadably secured to the ferrule 50 to maintain the relative positions of the stem 30 and ferrule 50 while the fitting 12 is crimped to the end 18 of the hose 14. The threadably coupled stem 30 and ferrule 50 form an integrated unit that resists separation during use in severe service conditions.

The stem 30 includes an annular flange 66 proximate the threads 60 and extending radially outward from the outer surface 46 of the stem 30. In this configuration, flange 66 on the stem 30 serves as a positive stop when the stem 30 is threadably coupled to the ferrule 50. To provide a sufficient mating surface on the ferrule 50, the first end 52 of the ferrule 50 is radiused. The ferrule 50 may further comprise raised circumferential ribs 70 formed on an inner surface 72 of the ferrule 50 to improve the holding integrity of the ferrule 50 while not unduly hindering the ability to crimp the ferrule 50 to the flexible hose 14.

Figure 2A:
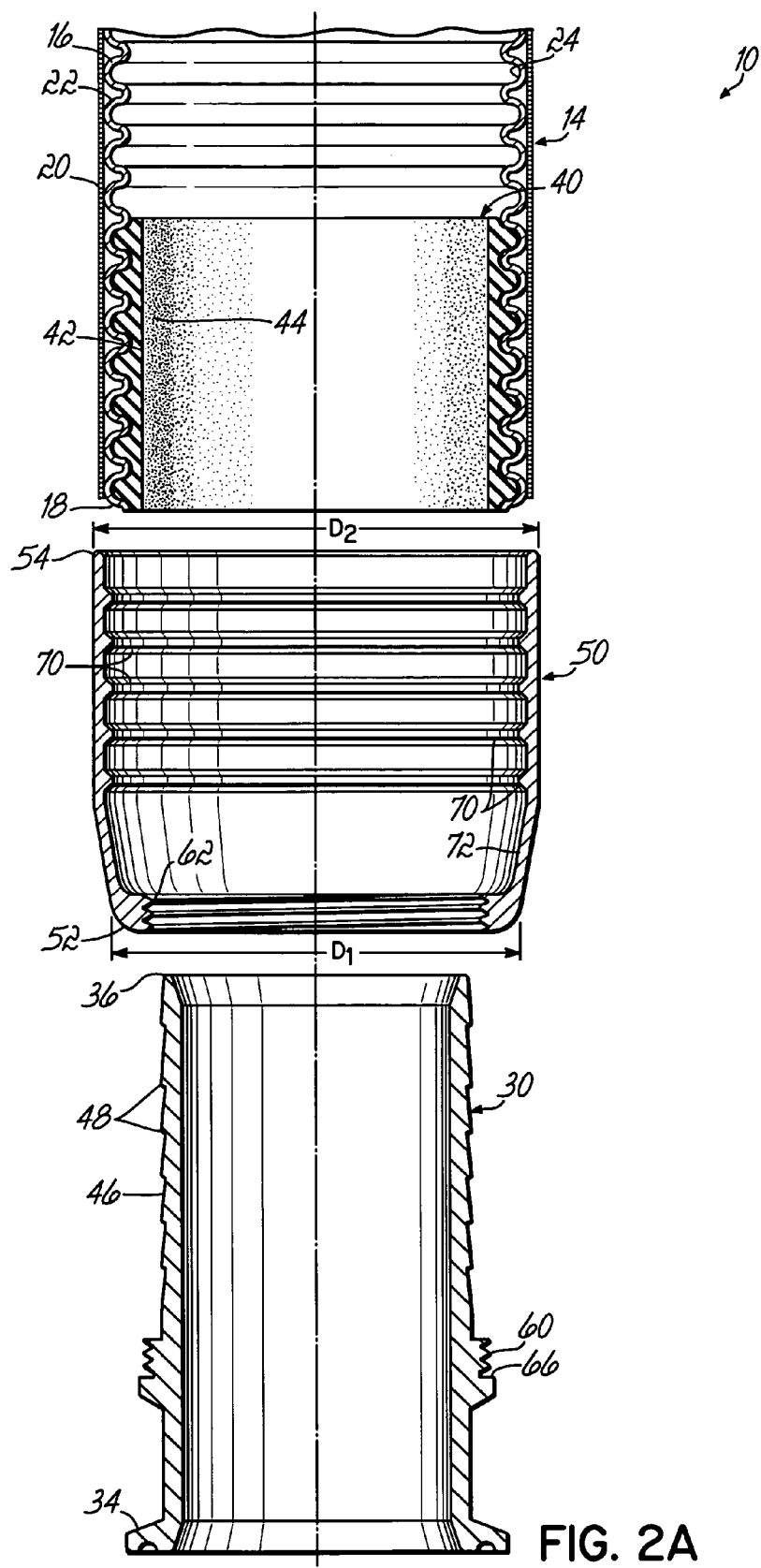
FIG. 2A is a cross-sectional view of the hose and fitting of FIG. 1, prior to assembly and crimping.
Figure 2B:
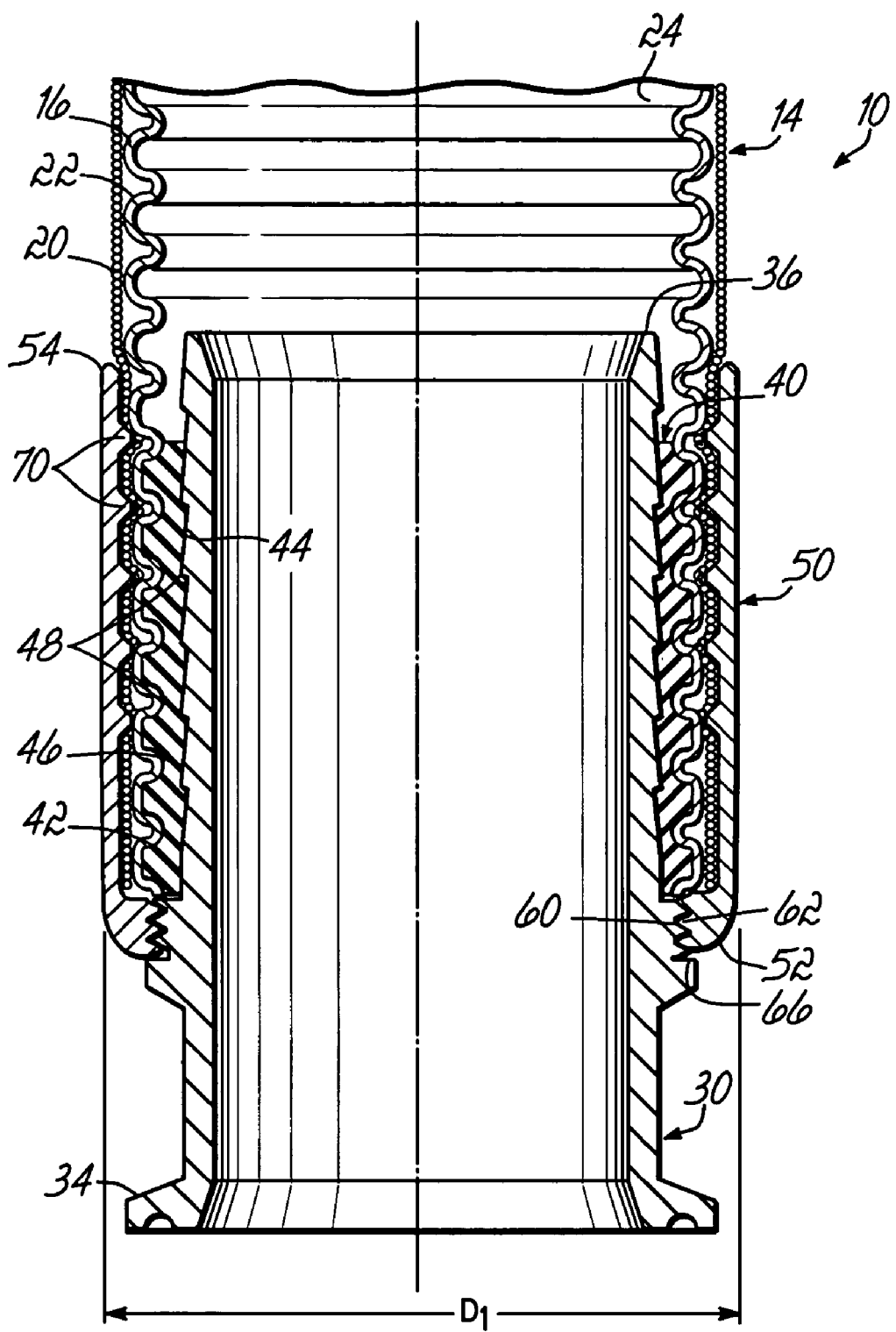
FIG. 2B is a cross sectional view of the hose and fitting of FIGS. 1 and 2, after assembly.

As shown most clearly in FIG. 2A, the first end 52 of the ferrule 50 has a first outer diameter D1 and the second end 54 of the ferrule 50 has a second outer diameter D2 which is which is initially greater than the first diameter D1. The larger, second diameter D2 facilitates installation of the first end 18 of the flexible hose 14 within the second end 54 of the ferrule 50 whereafter the ferrule 50 may be deformed by crimping the ferrule 50 such that the second diameter D2 is approximately equal to the first diameter D1, thereby compressing the first end 18 of the flexible hose 14 and the sealing member 40 between the ferrule 50 and the second end 36 of the stem 30, as depicted in FIG. 2B. While the ferrule 50 has been shown and described herein as having a second outer diameter D2 that is initially greater than the first outer diameter D1, it will be recognized that the ferrule may alternatively be formed with a uniform outer diameter sized to be received over the hose 14, whereafter the entire length of the ferrule is crimped to secure the fitting 12 to the hose 14.

In general, the ferrule 50 should be crimped an amount sufficient to compress the hose 14 such that the hose 14 is retained by the fitting 12 while avoiding puncturing of the hose 14, particularly the corrugated metal tube 16. In an exemplary embodiment, the ferrule 50 is crimped an amount which is sufficient to compress the sealing member 40 up to approximately 15% to 25% of its wall thickness. In order to obtain a sufficient crimp, the ferrule 50 should be made from a metal material which is not too soft. In an exemplary embodiment, the material of the ferrule 50 has a hardness of at least 150, as measured by a Brinell hardness test.

While the geometry of the stem 30 may be varied to accommodate different size hoses 14, the wall thickness of the second end 36 of the stem 30 should be sufficient to withstand the crimping pressure. In the exemplary embodiment, the wall thickness of the second end 36 of the stem 30 is not less than approximately one-eighth inch. Likewise, the wall thickness of the ferrule 50 should not be excessively large to thereby avoid excessive crimp forces necessary to crimp the ferrule 50. In an exemplary embodiment, the wall thickness of the ferrule 50 is not greater than approximately 0.06 to 0.10 inch.

Advantageously, the fitting 12 of the present invention may be crimped to the end 18 of a flexible hose 14 formed from corrugated metal tube 16 to provide a fluid tight joint between the fitting 12 and the flexible hose 14. Moreover, the fitting 12 may be crimped directly to the first end 18 of the hose 14 without requiring modification of the hose 14, such as stripping away covering materials including the braided metal sheath 20.

Exemplary flexible hose assemblies, having crimped fittings according to the present invention, were manufactured and tested. Each flexible hose was a 2-inch wire braided, metal hose with wide, annular corrugations manufactured by Witzenmann USA LLC, Warren Mich. The hose was rated for 370 psi at 70° F. Both the ferrule and stem portions of each fitting were formed from ASTM 316 stainless steel. In one test, fittings were crimped to both ends of a hose, one end crimped with a silicone sealing member, the other end having a sealing member formed from Buna rubber. The hose assembly was subjected to a helium leak test using an MD-490-S helium leak detector. The hose assembly was charged using 100% helium at 100 psig for 28 minutes. No leaks were detected. The hose assembly was subsequently hydrostatically tested to evaluate the integrity of the crimped fittings. At 1800 psi, the hose failed at a location intermediate the fittings (i.e. the hose failed before the fittings).

A second exemplary hose assembly was subjected to a vacuum leak test. The crimped hose assembly was charged to 25 mtorr with helium and then exposed to vacuum up to $1 \times 10^{-8}$ atm/cc/sec while monitoring the hose with an NIST traceable gas leak detector. No leak was detected.

In another aspect of the invention, a method for securing a fitting 12 to a flexible hose 14 having a corrugated metal tube 16 comprises inserting a tubular sealing member 40 into the corrugated metal tube 16, placing a ferrule 50 over the end 18 of the corrugated metal tube 16, inserting the end 36 of a stem 30 into the sealing member 40 within the corrugated metal tube 16, and crimping the ferrule 50 to compress the corrugated metal tube 16 and the sealing member 40 between the ferrule 50 and the stem 30.

In another embodiment, a method of securing a fitting 12 to a flexible hose 14 further comprises threadably coupling the ferrule 50 and the stem 30. The ferrule 50 and stem 30 may be threadably coupled prior to inserting the end 36 of the stem 30 into the sealing member 40 located within the corrugated metal tube 16, while simultaneously placing the ferrule 50 over the end 18 of the corrugated metal tube 16, or the ferrule 50 and stem 30 may be threadably coupled after the end 36 of the stem 30 has been inserted into the sealing member 40.

In yet another aspect of the invention, a hose assembly according to the present invention is formed by the methods described above.

While the present invention has been illustrated by the description of exemplary embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

The invention claimed is:

1. A fitting for an end of a flexible hose, the hose including a corrugated metal tube having an interior surface, the fitting comprising:
  an elongated, tubular stem having a first end adapted to engage a corresponding fitting surface, and a second end configured to be received in the flexible hose;
  a ferrule having a first end configured to receive said second end of said stem, and a second end configured to receive the end of the flexible hose, said ferrule configured to be crimped to the corrugated metal tube to thereby secure the fitting to the hose;
  an independently mountable sealing member sized to be received over said second end of said stem and having a contoured outer surface corresponding to the interior surface of the corrugated metal tube such that said contoured outer surface contacts substantially all of the interior surface of the corrugated metal tube along the length of said sealing member when inserted therein; and
  external threads formed on said stem, between said first and second ends, and corresponding internal threads formed on said first end of said ferrule, for threadably coupling said stem and said ferrule.

2. The fitting of claim 1, wherein said ferrule is formed with a substantially uniform outer diameter sized to initially receive the end of the flexible hose.

3. The fitting of claim 1, wherein said first end of said ferrule has a first outer diameter, and said second end of said ferrule has a second outer diameter sized to be initially greater than said first outer diameter, said ferrule configured such that said second end may be subsequently deformed to be approximately equal to said first outer diameter during attachment of the fitting to the hose.

4. The fitting of claim 1, wherein said ferrule is configured to be crimped an amount which compresses said sealing member up to approximately 15% to approximately 25% of its wall thickness.

5. The fitting of claim 1, further comprising circumferential barbs formed on an outer surface of said stem, proximate said second end.

6. The fitting of claim 1, further comprising raised circumferential ribs formed on an inner surface of said ferrule.

7. The fitting of claim 1, wherein said ferrule comprises metal material having a Brinell hardness of at least 150.

8. The fitting of claim 1, wherein said ferrule has a wall thickness not greater than approximately 0.1 inch.

9. A flexible hose assembly, comprising:
  corrugated metal tube including a first end and an interior surface; and
  a fitting permanently crimped to said first end of said tube, said fitting comprising:
    a ferrule having first and second ends, said second end of said ferrule circumscribing said first end of said corrugated metal tube,
    an elongated, tubular stem comprising a first end adapted to engage a corresponding fitting surface, and a second end extending through said first end of said ferrule and into said corrugated metal tube,
    an independently mounted tubular sealing member on said second end of said stem, between said stem and said corrugated metal tube, said sealing member having an undulating outer surface corresponding to said interior surface of said corrugated metal tube such that said undulating outer surface contacts substantially all of said interior surface of said corrugated metal tube along the length of said sealing member, and
    external threads formed on said stem, between said first and second ends, and corresponding internal threads formed on said first end of said ferrule, for threadably coupling said stem and said ferrule.

10. The hose assembly of claim 9, further comprising a braided sheath covering said corrugated metal tube and extending beneath said ferrule so that said sheath is crimped between said ferrule and said stem.

11. The hose assembly of claim 9, wherein said ferrule is formed with a substantially uniform outer diameter sized to initially receive said first end of said corrugated metal tube.

12. The hose assembly of claim 9, wherein said first end of said ferrule has a first outer diameter, and said second end of said ferrule has a second outer diameter sized to be initially greater than said first outer diameter, said ferrule configured such that said second end may be subsequently deformed to be approximately equal to said first outer diameter during crimping of said fitting to said corrugated metal tube.

13. The hose assembly of claim 9, wherein said ferrule is crimped to compress said sealing member up to approximately 15% to approximately 25% of its wall thickness.

14. A method of securing a fitting to a flexible hose having a corrugated metal tube, the fitting including a ferrule, a stem and a sealing member having a contoured outer surface corresronding to the interior surface of the corrugated metal tube, the method comprising:
  inserting the sealing member into the corrugated metal tube such that the contoured outer surface contacts substantially all of the interior surface of the corrugated metal tube along the length of the sealing member:
  placing the ferrule over the end of the corrugated metal tube:
  inserting an end of the stem into the sealing member disposed within the corrugated metal tube:

threadably coupling the ferrule to the stem: and crimping the ferrule to compress the corrugated metal tube and the sealing member between the ferrule and the stem.

15. A fitting for a hose formed from corrugated metal tube, the fitting comprising:
- an elongated, tubular stem having a first end adapted to engage a corresponding fitting surface, and a second end configured to be received in the hose;
- a ferrule having a first end configured to receive said second end of said stem, and a second end configured to receive the end of the hose, said ferrule configured to be crimped to the end of the corrugated metal tube to thereby secure the fitting to the hose;
- an independently mountable sealing member sized to be received over said second end of said stem, and having a contoured outer surface corresponding to the interior surface of the corrugated metal tube such that said contoured outer surface contacts substantially all of the interior surface of the corrugated metal tube along the length of the sealing member;
- external threads formed on said stem, between said first and second ends; and
- internal threads formed on said first end of said ferrule and configured to engage said external threads on said stem for threadably coupling said stem and said ferrule;
- wherein said first end of said ferrule has a first outer diameter, and said second end of said ferrule has a second outer diameter sized to be initially greater than said first outer diameter, said ferrule configured such that said second end may be subsequently deformed to be approximately equal to said first outer diameter during attachment of the fitting to the hose.

* * * * *

UNITED STATES PATENT AND TRADEMARK OFFICE
CERTIFICATE OF CORRECTION

PATENT NO. : 7,066,497 B2
APPLICATION NO. : 10/703232
DATED : June 27, 2006
INVENTOR(S) : Fullbeck et al.

It is certified that error appears in the above-identified patent and that said Letters Patent is hereby corrected as shown below:

Cover Page
Col. 2, reads "Wood Herron & Evans, LLP" and should read -- Wood, Herron & Evans, LLP --.

Column 3
Line 58, reads "...diameter D2 which is which is initially…" and should read
-- ...diameter D2 which is initially…--.

Column 4
Line 43, reads "Warren Mich." and should read -- Warren, Mich. --.

Column 6
Line 54 through Col. 7, line 3, claim 14, rewrite claim 14 as follows to show the correct indented format and punctuation:

14. A method of securing a fitting to a flexible hose having a corrugated metal tube, the fitting including a ferrule, a stem and a sealing member having a contoured outer surface corresponding to the interior surface of the corrugated metal tube, the method comprising:

inserting the sealing member into the corrugated metal tube such that the contoured outer surface contacts substantially all of the interior surface of the corrugated metal tube along the length of the sealing member;

placing the ferrule over the end of the corrugated metal tube;

inserting an end of the stem into the sealing member disposed within the corrugated metal tube; threadably coupling the ferrule to the stem; and crimping the ferrule to compress the corrugated metal tube and the sealing member between the ferrule and the stem.

Signed and Sealed this

Seventeenth Day of October, 2006

JON W. DUDAS
*Director of the United States Patent and Trademark Office*